US011787438B2

(12) United States Patent
Houshmand et al.

(10) Patent No.: US 11,787,438 B2
(45) Date of Patent: Oct. 17, 2023

(54) COLLABORATIVE VEHICLE PATH GENERATION

(71) Applicant: Zoox, Inc., Foster City, CA (US)

(72) Inventors: Arian Houshmand, San Francisco, CA (US); Ravi Verma Gogna, San Jose, CA (US); Mark Jonathon McClelland, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 196 days.

(21) Appl. No.: 17/125,890

(22) Filed: Dec. 17, 2020

(65) Prior Publication Data
US 2022/0194419 A1    Jun. 23, 2022

(51) Int. Cl.
*B60W 60/00* (2020.01)
*G05D 1/00* (2006.01)
*G01C 21/34* (2006.01)

(52) U.S. Cl.
CPC .... *B60W 60/0011* (2020.02); *B60W 60/0023* (2020.02); *G01C 21/3469* (2013.01);
(Continued)

(58) Field of Classification Search
CPC .......... B60W 60/0011; B60W 60/0023; B60W 2556/10; G01C 21/3469;
(Continued)

(56) References Cited

U.S. PATENT DOCUMENTS 10,133,275 B1 * 11/2018 Kobilarov ............... G06N 3/08
11,029,687 B2 *  6/2021 Herbach ............... G01C 21/34
(Continued)

FOREIGN PATENT DOCUMENTS

CN         111982109 A      11/2020
EP        3683646 A1 *  7/2020  ............ B60W 30/00
(Continued)

OTHER PUBLICATIONS

Watanabe Maki et al, Machine Translation of JP 2019185293 A (Year: 2019).*
(Continued)

*Primary Examiner* — Anne Marie Antonucci
*Assistant Examiner* — Patrick Daniel Mohl
(74) *Attorney, Agent, or Firm* — Lee & Hayes, P.C.

(57) ABSTRACT

A teleoperations system that collaboratively works with an autonomous vehicle guidance system to generate a path for controlling the autonomous vehicle may comprise generating one or more trajectories at the teleoperations system based at least in part on environment data received from the autonomous vehicle and presenting the one or more trajectories to a teleoperator (e.g., a human user, machine-learned model, or artificial intelligence component). A selection of one of the trajectories may be received at the teleoperations system and transmitted to the autonomous vehicle. The one or more trajectories may be generated at the teleoperations system and/or received from the autonomous vehicle. Regardless, the autonomous vehicle may generate a control trajectory based on the trajectory received from teleoperations, instead of merely implementing the trajectory from the teleoperations system.

20 Claims, 5 Drawing Sheets

(52) U.S. Cl.
CPC ......... *G05D 1/0038* (2013.01); *G05D 1/0088* (2013.01); *B60W 2556/10* (2020.02)

(58) Field of Classification Search
CPC ...... G01C 21/00–21/34; G05D 1/0038; G05D 2201/0213; G05D 1/0088
See application file for complete search history.

(56) References Cited

U.S. PATENT DOCUMENTS

| | | | | |
|---|---|---|---|---|
| 2017/0192423 | A1* | 7/2017 | Rust | G05D 1/0238 |
| 2018/0224850 | A1* | 8/2018 | Kroop | G08G 1/096725 |
| 2018/0281815 | A1* | 10/2018 | Stentz | H04W 4/40 |
| 2020/0239023 | A1* | 7/2020 | Srinivasan | G05D 1/0276 |
| 2020/0310417 | A1* | 10/2020 | Pedersen | G05D 1/0027 |

FOREIGN PATENT DOCUMENTS

| | | | |
|---|---|---|---|
| JP | 2019185293 | A | 10/2019 |
| JP | 2020144101 | A | 9/2020 |

OTHER PUBLICATIONS

The International Search Report and Written Opinion for PCT Application No. PCT/US21/63926, dated Apr. 14, 2022, 7 pages.

* cited by examiner

COLLABORATIVE VEHICLE PATH GENERATION

BACKGROUND

Autonomous vehicles may rely on various pathway indicators such as runway lights, lane markings, and/or the like to navigate. However, an autonomous vehicle may fail to navigate accurately and/or efficiently when such indicators are obscured (e.g., by snow, garbage, sand), degraded (e.g., burned out light, worn out lane markings), and/or invalidated (e.g., an obstruction partially blocks a lane, traffic signage and/or traffic cones indicate an alternate lane that conflicts with original lane markings).

BRIEF DESCRIPTION OF THE DRAWINGS

The detailed description is described with reference to the accompanying figures.

In the figures, the left-most digit(s) of a reference number identify the figure in which the reference number first appears. The same reference numbers in different figures indicate similar or identical items.

DETAILED DESCRIPTION

Figure 1:
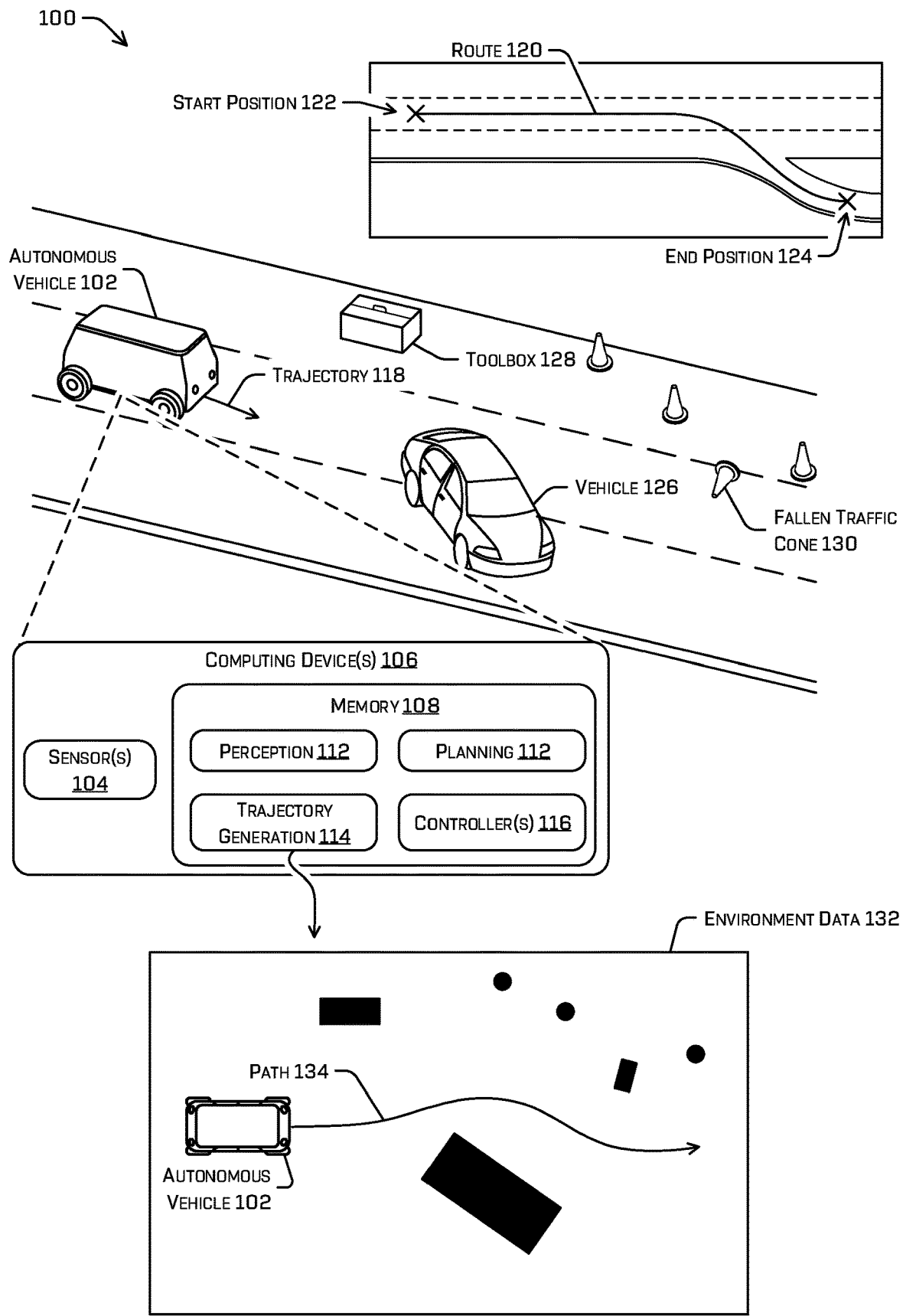
FIG. 1 illustrates an autonomous vehicle and an example scenario in which lane references (whether previously mapped or detected) may not be reliable for determining instructions for controlling motion of the vehicle.

Techniques for a teleoperations system that collaboratively works with an autonomous vehicle guidance system to generate a path for controlling the autonomous vehicle may comprise generating one or more trajectories at the teleoperations system based at least in part on sensor data received from the autonomous vehicle and presenting the one or more trajectories to a teleoperator (e.g., a human user, machine-learned model, or artificial intelligence component). A selection of one of the trajectories may be received at the teleoperations system and transmitted to the autonomous vehicle. The teleoperator may be remote from the vehicle and may service a plurality of vehicles. The transmission from the autonomous vehicle may include the trajectory itself, an identification of attributes of the trajectory, an identifier associated with the trajectory, and/or a weight associated with the trajectory, any of which may be used by the autonomous vehicle to determine a control trajectory (e.g., a trajectory used by the vehicle for autonomous navigation). In a first example, the autonomous vehicle may implement the trajectory received from the teleoperations system, although in another example, the autonomous vehicle may use the trajectory as part of a trajectory search algorithm to determine a control trajectory. For example, the trajectory search algorithm is discussed in more detail in U.S. patent application Ser. No. 16/517,506, filed Jul. 19, 2019, and U.S. patent application Ser. No. 16/872,284, filed May 11, 2020, both of which are incorporated in their entirety herein for all purposes.

The techniques may be triggered by the autonomous vehicle sending a request for assistance to the teleoperations system. In some examples, the request may include sensor data, perception data, and/or trajectory(ies) generated by the autonomous vehicle. In an additional or alternate example, the trajectory(ies) may be generated at the teleoperation system—the trajectory(ies) may be exclusively generated at the teleoperation system or trajectory(ies) may be generated at the teleoperation system in addition to or in tandem with the autonomous vehicle.

In some examples, the trajectory generation at the teleoperations system may be a same trajectory generation component as a trajectory generation component running on the autonomous vehicle, although in additional or alternate examples, the trajectory generation component accessible to the teleoperations system may be a dedicated hardware component and/or a more computationally-expensive trajectory generation component. For example, the trajectory generation component accessible to the teleoperations system to generate one or more trajectories for presentation to a teleoperator may be a cloud stored and/or executed hardware and/or software, effectively allowing the trajectory generation component to require up to supercomputer capabilities and/or laboratory conditions (e.g., if specialty hardware, such as a quantum computing device is used).

In other words, in a first example, trajectory generation may occur at both the autonomous vehicle and the remote computing device in a mirrored manner where the trajectories generated are the same or substantially the same. In a second example, trajectory generation may occur at both the autonomous vehicle and the remote computing device but trajectories generated at the remote computing device may be additional to or different than the trajectories generated at the autonomous vehicle due to more complex computation at the remote computing device (e.g., due to different hardware and/or software available to the remote computing system). In a third example, trajectory generation may occur at the autonomous vehicle at first but then may exclusively occur at the remote computing device after the request is transmitted by the autonomous vehicle until a reply is received from the remote computing device, at which time the autonomous vehicle continues trajectory generation (e.g., the trajectory generation may incorporate or be based on the reply from the teleoperations device). In at least one example, the autonomous vehicle will continue to generate trajectory(ies) after the request is sent to the remote computing device and any reply(ies) received from the remote computing device may be used as part of the trajectory generation process at the vehicle. In other words, the control trajectory determined by the autonomous vehicle may be different than the proposed trajectory received from the remote computing device since the autonomous vehicle uses the proposed trajectory as part of the trajectory generation process instead of implementing the proposed trajectory itself as a direct command.

The techniques discussed herein may allow the autonomous vehicle to send a request to teleoperations and receive the selected trajectory from teleoperations without needing to bring the autonomous vehicle to a stop. The vehicle may otherwise be required to stop because, for example, the vehicle may not be able to determine a favorable trajectory using its onboard capabilities. Other techniques of teleoperations assistance, such as teleoperator path drawing or other methods may require the autonomous vehicle to come to a stop or to slow to send the request to teleoperations and/or to await the teleoperator input. The techniques may additionally or alternatively enable teleoperation assistance to an autonomous vehicle moving at highway speeds. These improvements may increase the safety of the autonomous vehicle, improve the passenger experience, and increase the number of scenarios that the autonomous vehicle may navigate without needing to stop for more involved teleoperator input. In some examples, the techniques may allow a smaller and/or less computationally-expensive trajectory generation component to be stored/executed on the autonomous vehicle, thereby freeing up storage space and/or computation cycles.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic, and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, trajectory generation component 114, and/or controller(s) 116. In some examples, the planning component 112 may comprise the trajectory generation component 114. The perception component 110, the planning component 112, the trajectory generation component 114, and/or the controller(s) 116 may include one or more machine-learned (ML) models and/or other computer-executable instructions. In general, the perception component 110 may determine what is in the environment surrounding the vehicle 102 and the planning component 112 may determine how to operate the vehicle 102 according to information received from the perception component 110. For example, the trajectory generation component 114, which may be part of the planning component 112, may determine trajectory 118 based at least in part on the perception data and/or other information such as, for example, one or more maps, localization information (e.g., where the vehicle 102 is in the environment relative to a map and/or features detected by the perception component 110), and/or a path generated by the trajectory generation component 114.

The trajectory 118 may comprise instructions for controller(s) 116 of the autonomous vehicle 102 to actuate drive components of the vehicle 102 to effectuate a steering angle and/or steering rate, which may result in a vehicle position, vehicle velocity, and/or vehicle acceleration that tracks the path generated by the guidance system. For example, the trajectory 118 may comprise a target heading, target steering angle, target steering rate, target position, target velocity, and/or target acceleration for the controller(s) to track as part of the path. For example, the coarse path generated by the trajectory generation component 114 according to the techniques discussed herein may indicate vehicle positions, headings, velocities, and/or entry/exit curvatures at 500 millisecond time intervals and a smooth path output by the trajectory generation component 114 may comprise such points at a 10 or 100 millisecond interval, which may correspond to a time interval associated with the trajectory 118. In some examples, the controller(s) may comprise software and/or hardware for actuating drive components of the vehicle 102 sufficient to track the trajectory 118.

In the example scenario 100, the autonomous vehicle 102 has received and/or determined a route 120 defining a start position 122, an end position 124, and a curve between the start position 122 and the end position 124 (note that the curve comprises a straight line and/or one or more curves). For example, the planning component 112 may have determined the route 120 based at least in part on sensor data and an end position received as part of a mission (e.g., from a passenger, from a command center). As used herein, references to a "position" may comprise both a location and/or a pose (e.g., position and/or orientation/heading of the vehicle). In some examples, the route may not comprise end position 124 and may additionally or alternatively comprise a target position, such as a target lane, target relative position (e.g., 10 feet from roadway edge), target object (e.g., follow vehicle, follow passenger, move toward an individual hailing the vehicle), etc.

As the vehicle operates to reach the end position 124, the autonomous vehicle 102 may encounter a scenario like example scenario 100 in which a planning component may determine a trajectory and a confidence score associated therewith (e.g., via an ML model) and may determine that the confidence score does not meet a confidence score threshold. For example, such a scenario may occur when a variety of objects (e.g. a blocking vehicle 126, toolbox 128, and fallen traffic cone 130) cumulatively block all three lanes of the depicted roadway, which may cause the autonomous vehicle 102 to call teleoperations because no one lane has sufficient room for the autonomous vehicle.

In some examples, the perception component 110 may receive sensor data from the sensor(s) 104 and determine data related to objects in the vicinity of the vehicle 102, such as the static and/or dynamic data. The depicted example of the environment data 132 comprising static and/or dynamic data is a top-down representation of such data, but any representation of the static and/or dynamic data is contemplated, such as a heat map, object classifications associated with detected objects, instance segmentation(s), semantic segmentation(s), two and/or three-dimensional bounding boxes, tracks, etc. The perception component 110 may additionally or alternatively determine route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), track data (e.g., the environment representations, object detections, and/or tracks discussed herein), etc.

In some examples, the perception component 110 may comprise a pipeline of hardware and/or software, which may include one or more GPU(s), ML model(s), Kalman filter(s), and/or the like. In some examples, the perception component 110 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. For example, the sensor data may comprise radar data, which the perception component 110 may receive as input. The perception component 110 may be configured to detect as many objects and information about the environment as possible to avoid failing to account for an event or object behavior that should be taken into account by the planning component 112 in determining the trajectory 118.

The object classifications, which may be part of the environment data 132 and determined by the perception component 110, may distinguish between different object types such as, for example, a passenger vehicle, a pedestrian, a bicyclist, a delivery truck, a semi-truck, traffic signage, and/or the like. A track may comprise a historical, current, and/or predicted object position, velocity, acceleration, and/or heading. The data produced by the perception component 110 may be collectively referred to as perception data. Once/as the perception component 110 generates perception data, the perception component 110 may provide the perception data to the planning component 112 and/or the trajectory generation component 114. In some examples, perception data may comprise outputs of sensor specific pipelines (e.g., vision, lidar, radar) and/or hybrid sensor pipelines (e.g. vision-lidar, radar-lidar).

The planning component 112 may use the perception data received from perception component 110 and/or a path received from the trajectory generation component 114, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; determine a smooth trajectory from a coarse trajectory received from the guidance system; generate, substantially simultaneously and based at least in part on the path and perception data and/or simulated perception data (which may further include predictions regarding detected objects in such data), a plurality of potential trajectories for controlling motion of the vehicle 102 in accordance with a receding horizon technique (e.g., 1 microsecond, half a second) to control the vehicle to traverse the route (e.g., in order to avoid any of the detected objects); and select one of the potential trajectories as a trajectory 118 of the vehicle 102 that may be used to generate a drive control signal that may be transmitted to the controller(s) 116 for actuating drive components of the vehicle 102. FIG. 1 depicts an example of such a trajectory 118, represented as an arrow indicating a heading, velocity, and/or acceleration, although the trajectory itself may comprise instructions for controller(s), which may, in turn, actuate a drive system of the vehicle 102. In some examples, the trajectory 118 may be a part of a path 134. The path 134 may comprise one or more trajectories, each of which may be associated with a different segment of time or distance up to a time or distance horizon.

In some examples, the trajectory generation component 114 may be a component of the planning component 112. The trajectory generation component 114 may comprise one or more GPUs or may be communicatively coupled with one or more GPUs (e.g., via a publish-subscribe messaging system, via a data bus) and the techniques discussed herein may be parallelized and disseminated to threads of the GPUs, although it is contemplated that the techniques discussed herein may comprise at least portions that are serial.

In some examples, trajectory(ies) determined by the trajectory generation component 114 may be transmitted to a teleoperations device with a request for teleoperations assistance. The autonomous vehicle may transmit such a request to a remote computing device when the trajectory generation component 114 fails to generate a feasible, collision-free, and/or economical path or trajectory. According to the techniques discussed herein the autonomous vehicle 102 may continue to move and/or move at speed without stopping and still receive control path confirmation data from a teleoperator. In some examples, this is accomplished by incorporating teleoperations input as part of the trajectory generation process at the trajectory generation 114. For example, the trajectory generation component 114 may continue generating and selecting trajectory(ies) for controlling the autonomous vehicle, e.g., according to the techniques discussed in U.S. patent application Ser. No. 16/517, 506 and/or Ser. No. 16/872,284, and may use the teleoperations input as a weight or target lane/region/trajectory.

Example System

Figure 2:
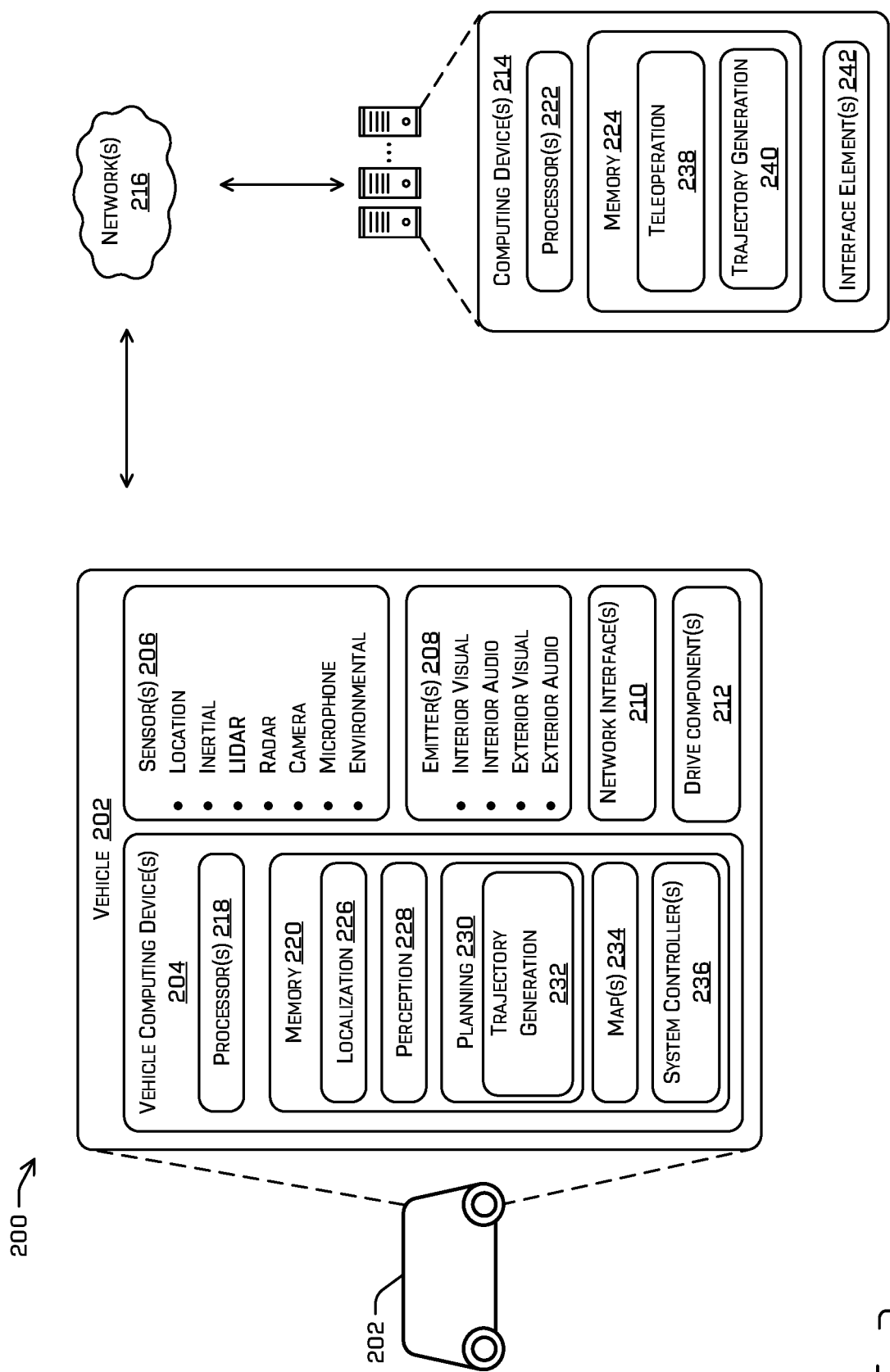
FIG. 2 illustrates a block diagram of an example autonomous vehicle architecture comprising a guidance system for collaborative path planning.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface (s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, trajectory generation component 232 (which may be software and/or hardware, e.g., a portion may be hardware, such as GPU(s), CPU(s), FPGA(s), ASIC(s), and/or other processing units), map(s) 234, and/or system controller(s) 236. Perception component 228 may represent perception component 110, planning component 230 may represent planning component 112, trajectory generation component 232 may represent trajectory generation component 114, and system controller(s) 236 may represent controller(s) 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) 234 of an environment and can continuously determine a location, velocity, and/or orientation of the autonomous vehicle within the map(s) 234. In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the perception component 228, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith).

The trajectory generation component 232 may operate on the vehicle 202 and/or on the computing device(s) 214. In some examples, the trajectory generation component 232 may be downstream (receive input) from at least some components of the perception component 228 and may be part of or upstream from at least part of the planning component 230 (e.g., upstream from at least a trajectory checking component that verifies that the trajectory will result in feasible/drivable, collision-free, and/or economic driving instructions). The trajectory generation component 232 may be configured to pass all, part, or none of the output of the trajectory generation component 232 to the planning component 230. In some examples, the trajectory generation component 232 may be part of the perception component 228. The trajectory generation component 232 may be configured to generate a coarse path, as discussed herein, which the planning component 230 may use to generate a smooth path and a trajectory that tracks the smooth path or, in an additional or alternate example, the trajectory generation component 232 may determine both the coarse path and the smooth path or may directly compute the smooth path.

In at least one example, the trajectory and/or other transmission received from a teleoperation component 238 may be used as a course trajectory for use by the trajectory generation component 232 to determine a smooth trajectory and/or to complete a smooth path. For example, the teleoperation component 238 may identify one or more locations to target and the trajectory generation component 238 may use the one or more locations to determine weights associated with different candidate trajectories generated by the trajectory generation component 238. For example, in a system where a higher cost indicates a less desirable trajectory, the further a candidate trajectory is from one of the locations, the greater the weight determined for the candidate trajectory and vice versa the closer the candidate trajectory is to the location. Additionally or alternatively, the system may be inverted and the weight may be reduced the further the candidate trajectory would cause the autonomous vehicle to be from the location.

Memory 224 may additionally or alternatively include a teleoperation component 238 and/or a trajectory generation component 240. Teleoperation component 238 may manage requests received from the vehicle 202 and may cause presentation, via one or more interface elements 242, of a representation of sensor data and/or perception data received from the vehicle 202 along with trajectory(ies) generated by trajectory generation component 232 and/or trajectory generation component 240. In some examples, the teleoperation component may determine a portion of the sensor data and/or perception data to display and/or an arrangement thereof.

The trajectory generation component 240 may be the same or different than the trajectory generation component 232. According to a first example where the trajectory generation components are the same, the teleoperation component 238 may receive an input selecting one of the candidate trajectories generated by the trajectory generation component 240 and transmit an identifier associated with that trajectory (e.g., a hash of instructions representing the trajectory, such as a hash of the velocity, heading, curvature, etc. associated with the trajectory). In an additional or alternate example, whether the trajectory generation components are the same or not, the teleoperation component 238 may receive input from a teleoperator identifying one of the candidate trajectories generated by trajectory generation component 240 or received from trajectory generation component 232 and, based at least in part on the receiving the teleoperator input, teleoperation component 238 may transmit the trajectory and/or a weight associated with the trajectory to the vehicle 202.

In some examples, the weight may identify how strongly the trajectory generation component 232 should adhere to the trajectory transmitted from the teleoperation component 238. The weight may be a parameter selectable via a user interface presented by the teleoperation component 238 as a slider bar, field, or similar user interface component. Regardless, the trajectory generation component 232 on the vehicle 202 may use the trajectory received from the teleoperation component 238 as part of trajectory generation on the vehicle, such as according to U.S. patent application Ser. No. 16/517,506 and/or Ser. No. 16/872,284

The interface element(s) 242 may include any interface element suitable for the type of teleoperator with which the interface is associated. For example, if the teleoperator is a human user, the interface element(s) 242 may include display(s), speaker(s), haptic feedback mechanism(s), a graphical user interface, application programming interface(s), touch input element(s), a mouse, keyboard, and/or the like. In an example where the teleoperator comprises an ML model and/or artificial intelligence component, the interface element(s) 242 may comprise an electronic communication bus, application programming interface(s), a publish-subscribe network, and/or the like.

The memory 220 and/or 224 may additionally or alternatively store a mapping system (e.g., generating a map based at least in part on sensor data), a planning system, a ride management system, etc. Although localization component 226, perception component 228, planning component 230, trajectory generation component 232, map(s) 234, and/or system controller(s) 236 are illustrated as being stored in memory 220, any of these components may include processor-executable instructions, machine-learned model(s) (e.g., a neural network), and/or hardware and all or part of any of these components may be stored on memory 224 or configured as part of computing device(s) 214.

As described herein, the localization component 226, the perception component 228, the planning component 230, the trajectory generation component 232, trajectory generation component 240, and/or other components of the system 200 may comprise one or more ML models. For example, the localization component 226, the perception component 228, the planning component 230, and/or the trajectory generation component(s) 232 and/or 240 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as a Pixor model, in some examples.

In some examples, an ML model may comprise a neural network such as, for example, a convolutional neural network (CNN). As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters. Although discussed in the context of neural networks, any type of machine-learning can be used consistent with this disclosure. In some examples, the trajectory generation component 232 discussed herein and/or an ML model may comprise processor-executable instructions stored in a memory of the computing device(s) 204 and/or accessible thereto, hardware, and/or some combination thereof (e.g., a field-programmable gate array (FPGA), application-specific integrated circuit (ASIC)).

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on perception data generated by the perception component 228 and/or trajectory generation component 232, and may validate the perception data and/or path generated by the trajectory generation component 232, and/or transmit instructions to the system controller(s) 236. The system controller(s) 236 may control operation of the vehicle 202 based at least in part on the instructions received from the planning component 230.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Process

Figure 3:
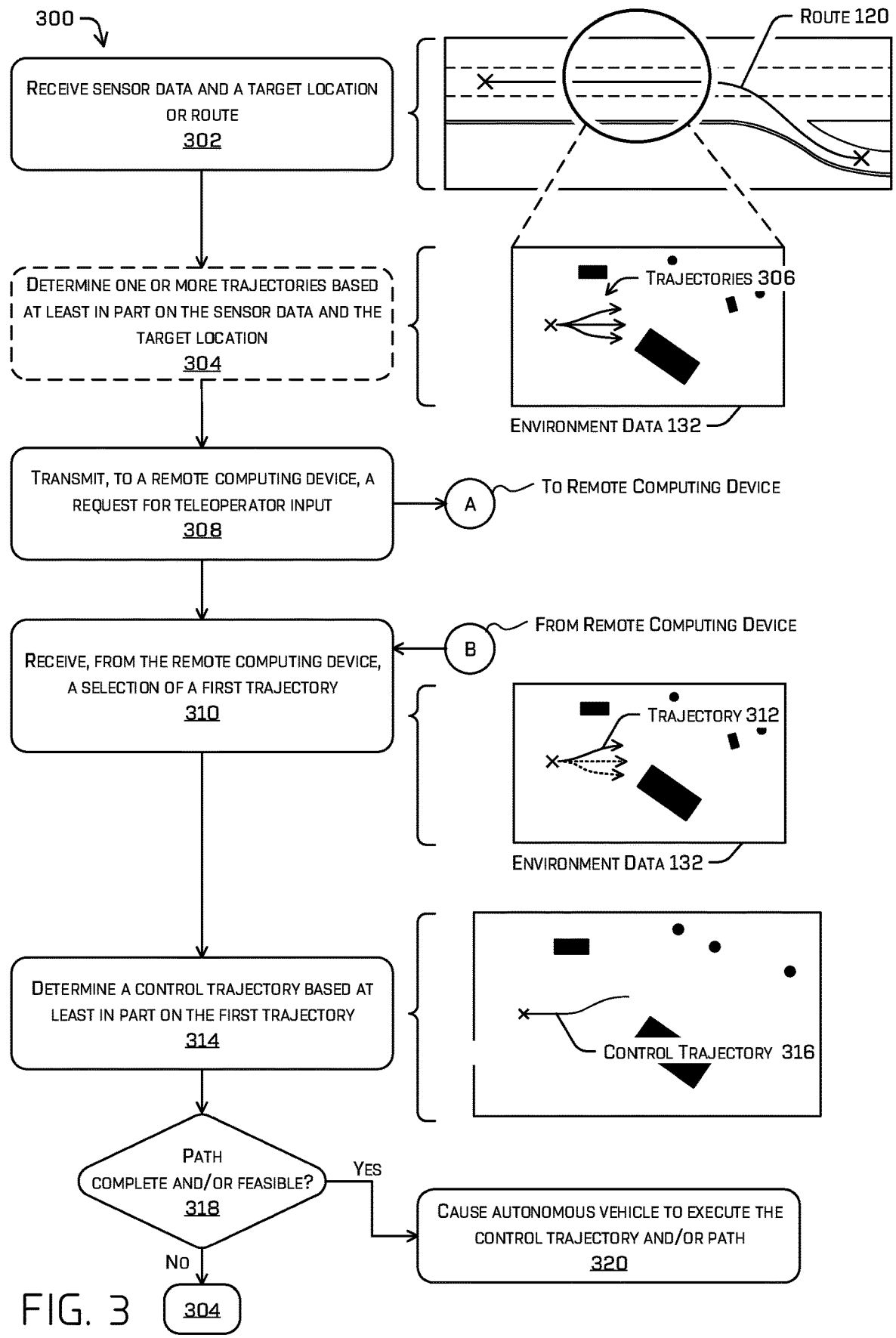
FIG. 3 illustrates a pictorial flow diagram of an example process executed at an autonomous vehicle for generating a path for controlling an autonomous vehicle.
Figure 4:
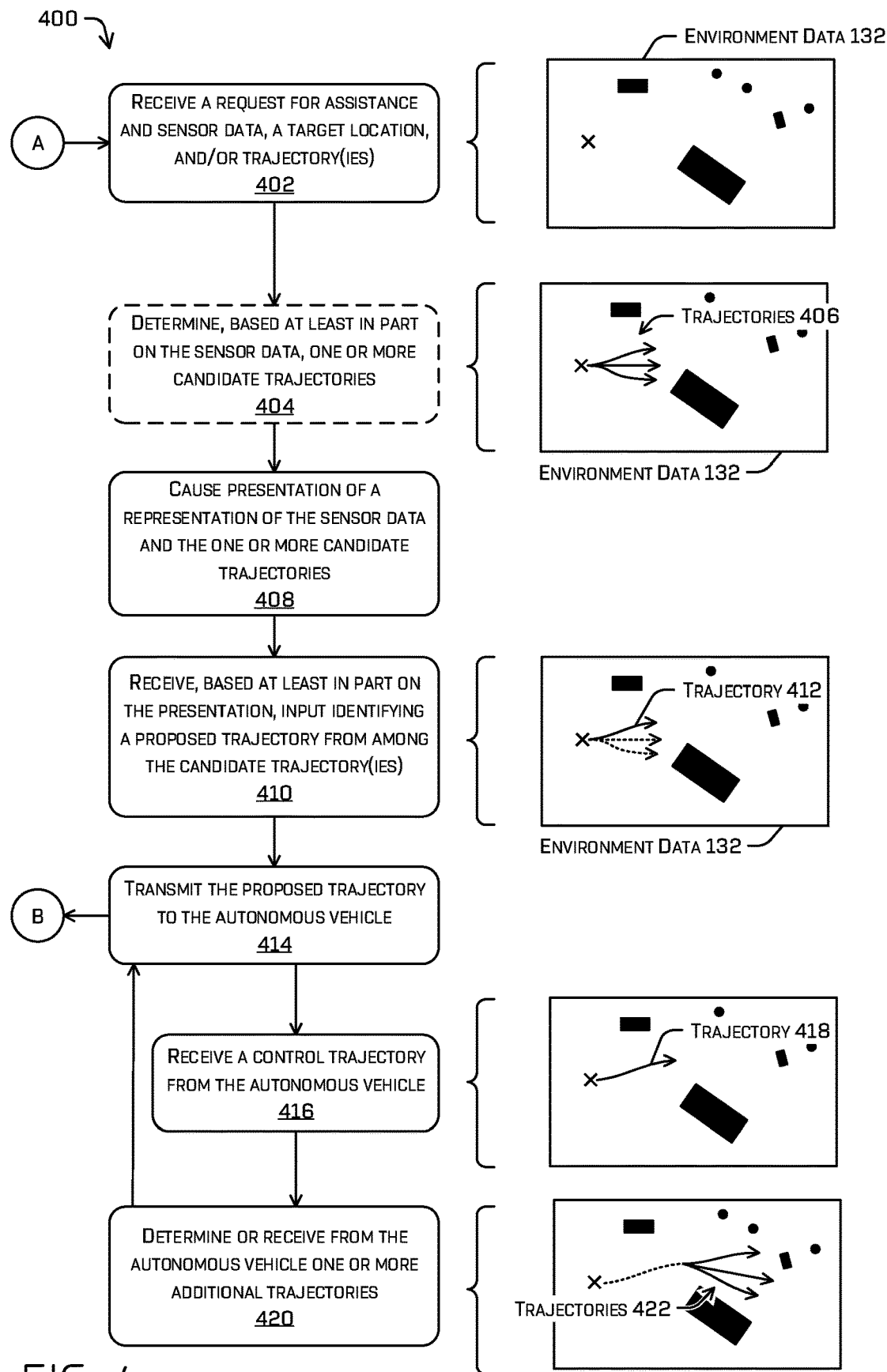
FIG. 4 illustrates a pictorial flow diagram of an example process executed at a remote computing device to collaboratively generate a path for controlling an autonomous vehicle.

FIGS. 3 and 4 illustrate a pictorial flow diagram of an example process 300 and 400 for collaboratively generating a trajectory for controlling an autonomous vehicle. In some examples, example process 300 may be executed by an autonomous vehicle and example process 400 may be executed by a remote computing device (i.e., a teleoperations device) configured to receive input from a teleoperator, which may be a human user, ML model pipeline, and/or artificial intelligence component. In some examples, at least a portion of example process 300 may occur simultaneously, substantially simultaneously, and/or interleaved with operations of example process 400.

At operation 302, example process 300 may comprise receiving sensor data and a target location or route, according to any of the techniques discussed herein. For example, the sensor data may comprise LIDAR data, radar data, infrared image data, visual image data, sonar data, and/or the like. The autonomous vehicle may receive any such sensor data and, in some examples, may additionally or alternatively determine perception data associated with the sensor data, such as a top-down representation of the environment, such as the top-down representation of environment data 132 depicts in FIG. 3, which may represent static and/or dynamic object data. For the sake of simplicity, a single frame of environment data 132 is depicted, even though the environment data 132 may comprise multiple frames associated with different time steps depicting the predicted position(s) of object(s) in the environment associated with the autonomous vehicle.

A target location may identify a goal location, goal region, goal lane, goal orientation, and/or the like. A route 120 may comprise at least a start position and an end position associated within an environment. In some examples, the start position may identify a current pose (e.g., position and/or heading) of an autonomous vehicle and/or the end position may identify a target pose of the autonomous vehicle. The route may additionally or alternatively identify one or more curves between the start position and end position and/or a vehicle pose in association with the start position and/or end position. For example, the start position may identify a location within a first lane of a roadway and the end position may identify a location within a second lane two city blocks, a right-hand turn, and an additional city block away from the start position. In other words, the route may be a high-level mission of the autonomous vehicle. As used herein, a curve may include a straight line. Note that the vehicle's position is indicated with an "x."

At operation 304, example process 300 may comprise determining one or more trajectories 306 based at least in part on the sensor data and the target location (and/or route), according to any of the techniques discussed herein. The trajectory(ies) 306 are depicted as arrows in FIG. 3 and the vehicle's current position is indicated with an "x." Trajectory(ies) 306 may be considered candidate trajectories. Operation 304 is shown in a dashed box since, in at least one example, the teleoperation device may entirely generate the one or more trajectories once a request for teleoperator assistance has been transmitted to the remote device. Note that the request may be transmitted to the remote computing device before or after operation 304. In another example, the autonomous vehicle may determine the trajectories then determine to transmit the request and cease generating trajectories until teleoperator input is received. In yet another example, the autonomous vehicle may determine the trajectories and may continue to generate trajectory(ies) even once the request has been transmitted. The examples may enable the autonomous vehicle to continue to operate without stopping.

Determining the trajectory(ies) 306 may be based at least in part on the environment data 132 that is determined by the autonomous vehicle based at least in part on the sensor data. For example, determining the trajectory(ies) 306 may comprise determining a distance map wherein a location in the distance map indicates the distance from the location to a nearest portion indicated in the environment data as being occupied. Note that the distance map may be determined for each time step of dynamic data of the environment data 132, one or more of the time steps of the dynamic data, and/or an amalgamated distance map may be determined (e.g., an average of multiple distance maps). The static data of the environment data 132 and/or the dynamic data may indicate likelihoods and/or binary indications that a portion of the environment is/isn't occupied.

For example, the static data may indicate the existence of a static object by indicating a maximum likelihood (e.g., 1 in an example where the likelihoods range from 0 to 1 with 1 being a confident indication that an object exists) and the dynamic data may indicate the likely position of an object by a likelihood between 0 and 1 (non-inclusive of 1), although other systems may be used to indicate static and dynamic objects, such as using logits. In some examples, the distance map may be calculated based at least in part on filtering the environment data (i.e., the static data and/or the dynamic data) using a likelihood threshold to determine a binary mask. In other words, determining a distance may be based at least in part on the distance from a point in the environment to the nearest portion of the environment data indicating a likelihood equal to or greater than the threshold.

Operation 304 may additionally or alternatively comprise determining a cost map based at least in part on the environment data. In some examples, determining the cost map comprise determining a cost associated with reaching a position, heading, velocity, acceleration (e.g., longitudinal and/or lateral acceleration), and/or entry/exit curvature in the environment, although for simplicity the discussion herein predominantly discusses reaching a position. Note that the cost map may be associated with a multivariate space associated with these different metrics (e.g., position, heading, velocity, curvature), which is drastically simplified in the figures. Practically, this means that a first cost may be associated with a position, heading, and velocity, but a different cost may be associated with a different velocity but the same position and heading.

Determining the cost may be based at least in part on a pre-computed field of visitation costs indicating a weight associated with maneuvers required to reach different portions of the multivariate space. The pre-computed field of visitation costs may comprise multiple fields for different speeds (e.g., 5 miles per hour, 15 miles per hour, and so on). For example, the cost of reaching a position and heading ten feet in front of a vehicle may be higher if the velocity at that position is higher or lower than the current speed of the vehicle (e.g., if the vehicle is traveling at 30 miles per hour, a first cost for reaching the same position and heading at 25 miles per hour or 35 miles per hour would be less than a second cost of reaching the same position and heading at 10 miles per hour or 50 miles per hour).

Determining the cost may additionally or alternatively be based at least in part on determining a distance from a position in the cost map to a target reference such as a target lane, determining a distance to a static or dynamic object (which may be based on the distance map that may be determined at operation 304, and/or determining a likelihood of collision based at least in part on the static data, the dynamic data, and/or the distance map that may be determined at operation 304. For example, the cost may be based on the distance to a nearest object and/or a speed and/or direction of travel of a nearest dynamic object. The cost may additionally or alternatively be based at least in part on a deviation cost that is based at least in part on a deviation of the position, heading, velocity, and/or curvature specified by the position in the multivariate space from the route or other reference point (e.g., a target lane) and/or a displacement along the route. For example, the cost may decrease as displacement along the route increases. Determining the displacement along the route may comprise projecting the point onto the route to and determining a portion of the route that would effectively be traversed. The deviation cost may additionally or alternatively be based at least in part on a deviation of the position, heading, velocity, etc. in the multivariate space from a current position, heading, velocity, etc. of the vehicle.

In some examples, determining a cost may be based at least in part on an object classification associated with an object. For example, different cost functions may be associated with different types of objects since the object's behavior and/or importance may vary. For example, the cost function associated with a static object may not comprise a component to account for movement and a cost function associated with a vehicle may be different than a cost function associated with a pedestrian.

The cost map may be used to search for a path comprising one or more trajectories that has a cost below a threshold or a minimum cost, meets a goal (e.g., part of the route, such putting the vehicle in a lane that has the option to make a turn that is part of the route), and/or has a displacement along the route that meets or exceeds a threshold or that is a maximum. For example, the cost map may be used as part of a search algorithm that may operate to determine a path that decreases the cost, increases the displacement, and/or meets mission objectives. The search algorithm may comprise, for example, D*, D*lite, Focused Dynamic A*, A*, LPA*, Dijkstra's algorithm, and/or the like, although other search algorithms for searching and/or generating a directed graph and/or a weighted directed graph may be used, as discussed in more detail in U.S. patent application Ser. No. 16/517,506 and/or Ser. No. 16/872,284.

Operation 304 may additionally or alternatively comprise determining a confidence score associated with a trajectory indicating a likelihood (e.g., a posterior probability) that the trajectory is collision-free, economic, and/or the like. In some examples, the confidence score may be generated by an ML model and may be based on a cost associated with the trajectory, determined as discussed above.

At operation 308, example process 300 may comprise transmitting, to a remote computing device, a request for teleoperator input, according to any of the techniques discussed herein. In some examples, the request may identify a type of request; at least part of the environment data 132, which may comprise sensor data, including a location of the vehicle determined from the sensor data; information about the vehicle; and/or the like. In an example where operation 304 occurs, operation 308 may comprise transmitting one or more of the trajectories 306 to the remote computing device. In some examples, transmitting the request may be based at least in part on determining that a confidence score associated with the trajectory does not meet a confidence score threshold and/or a cost associated with the trajectory meets or exceeds a cost threshold. For example, the autonomous vehicle may determine that none of the trajectories 306 are associated with a sufficient confidence score and/or cost, e.g., by determining that the confidence scores aren't high enough or the costs are too high. Note that this example assumes that a greater magnitude of confidence score indicates a lower likelihood of collision, greater economy, greater passenger comfort, and/or the like and a greater magnitude of cost indicates a higher likelihood of collision, lesser economy, etc, although in additional or alternate examples this may be inverted for either or both confidence scores or costs and the thresholds with which they are associated.

At operation 310, example process 300 may comprise receiving, from the remote computing device, a selection of a first trajectory, according to any of the techniques discussed herein. In a first example, the first trajectory may be one of the trajectories 306 generated by the vehicle. In such an example, receiving the first trajectory may include receiving an identification of one of the trajectories, such as trajectory 312. In another example, the first trajectory may be a trajectory determined at the remote computing device. Regardless, the first trajectory received from the remote computing device may be a complete trajectory or the first trajectory may be part of a trajectory or a target for the trajectory. According to the latter example, the first trajectory may identify a lane, region, or location, whereas according to the former example, the first trajectory may identify a curve identifying a steering angle and/or steering rate, a velocity, and/or an acceleration. In some examples, the first trajectory received form the remote computing device may comprise a weight. The weight may indicate how hard the trajectory generation component should try to generate a trajectory that matches or meets the first trajectory. Practically speaking, the weight may be used as part of the determination of a cost map determined as part of the trajectory generation. For example, the greater the weight, the greater the cost for trajectories that deviate from the first trajectory. A vehicle may use a weighted trajectory because, for example, there may be a delay between when a teleoperations trajectory is requested and when a weighted or otherwise selected trajectory is received from the teleoperator. In between these times, the vehicle may gather additional sensor data that may be used to more accurately determine a desirable trajectory. In such examples, a vehicle may disregard or modify a selected/weighted trajectory received from a teleoperator. In such an example, the vehicle may determine a second trajectory based at least in part on second sensor data associated with a second time that is later than a first time associated with operation 302. Operation 314, determining the control trajectory, may be based at least in part on the first trajectory received from the remote computing device, a trajectory determined at operation 314, and/or the second trajectory determined by the vehicle using second sensor data.

At operation 314, example process 300 may comprise determining a control trajectory 316 based at least in part on the first trajectory, according to any of the techniques discussed herein. The control trajectory 316 may be the same or different as the first trajectory. In at least one example, the control trajectory may be one of the trajectories generated by the vehicle itself (e.g., one of trajectories 306) although in an additional or alternate example, the environment data may have been updated between the time the request was transmitted and the first trajectory was received. Regardless, the vehicle may determine the control trajectory based at least in part on determining a cost map according to the discussion above regarding operation 304 and including a cost function that accounts for the first trajectory as discussed above. For example, the cost function may penalize (e.g., increase the cost) of a candidate trajectory based at least in part on a difference between the trajectory and the first trajectory received from the remote computing device. The vehicle may use the control trajectory 316 to control operation of one or more drive components of the autonomous vehicle.

At operation 318, example process 300 may comprise determining whether a path comprising the control trajectory determined at operation 314 is complete and/or feasible, according to any of the techniques discussed herein. A path may comprise a sufficient number of trajectories to control the autonomous vehicle from a current time and/or location up to a time horizon or displacement. For example, a path may include any number of trajectories sufficient to control the autonomous vehicle for the next 2 seconds, one second, 500 milliseconds, or any other time span where a time horizon is being used or for the next 10 feet, 100 feet, or the like in instances where a distance is being used. The path may be complete once trajectory(ies) sufficient to control the autonomous vehicle up to the horizon have been generated. If the path is complete, example process may transition to operation 320 although in at least some examples, the example process may comprise implementing the control trajectory 316 immediately regardless of whether the path is complete.

The feasibility of the path may be checked by a validation component of the planner, as discussed in more detail in U.S. patent application Ser. No. 16/588,529, filed Sep. 30, 2019, which is incorporated herein for all purposes. If the validation component indicates that the path is invalid, example process 300 may return to operation 304, 308, and/or 314. If example process 300 returns to operation 304 or 314, example process 300 may blacklist the last trajectory chosen and re-determine a trajectory.

At operation 320, example process 300 may comprise causing the autonomous vehicle to execute the control trajectory and/or path, according to any of the techniques discussed herein.

Turning to example process 400, which may be executed by the remote computing device, at operation 402, example process 400 may comprise receiving a request for assistance and sensor data, a target location, and/or trajectory(ies), according to any of the techniques discussed herein. In at least one example, operation 402 may comprise receiving environment data 132, which may be streamed or otherwise transmitted form the vehicle. The target location may specify a portion of the route or the route itself may be received.

At operation 404, example process 400 may comprise determining, based at least in part on the sensor data, one or more candidate trajectories 406, according to any of the techniques discussed herein. For example, the trajectory may be received from a planning component of the autonomous vehicle. The trajectory may indicate a current and/or target position, velocity, acceleration, heading, steering angle, and/or steering rate. The trajectory(ies) 406 may be one or more trajectories generated at the vehicle, such as trajectory(ies) 306, or trajectory(ies) 406 may be additional to or replace at least one of the trajectory(ies) 306. In some examples, the trajectory(ies) 406 may be generated using a same component as the trajectory generation component on the vehicle, a same software component of the trajectory generation component run on different hardware, and/or an entirely different software and/or hardware component. For example, determining the candidate trajectory(ies) 406 at the remote computing device may comprise calling an application programming interface of a more complex software pipeline run by a distributed computing cluster, such as a cloud computing service.

In some examples, operation 404 may comprise receiving any of the environmental data from the vehicle, including perception data, and/or one or more trajectories generated by the vehicle itself. Additionally or alternatively, operation 404 may comprise determining a proposed trajectory based at least in part on at least one of the one or more trajectories generated by the vehicle. For example, determining the proposed trajectory may comprise determining a plurality of trajectories that are based at least in part on one or more of the trajectories received from the vehicle, and determining a weight associated with the proposed trajectory (and/or any of the other trajectories), wherein the weight indicates an improvement of the trajectory compared to a trajectory generated by the vehicle. For example, the trajectory may be less likely to result in a collision, less jarring or otherwise smoother to the perceptions of a passenger, more economical, or the like.

At operation 408, example process 400 may comprise causing presentation of a representation of the sensor data and the one or more candidate trajectories, according to any of the techniques discussed herein. In some examples, causing presentation of the one or more candidate trajectories may comprise causing display of an animation of the vehicle executing a candidate trajectory, a resultant pose of the vehicle after executing a candidate trajectory, a curve identifying a potential position of the vehicle over time according to a candidate trajectory, and/or the like. Sufficient environment data may be presented to the teleoperator to allow the teleoperator to make provide input At operation 410, example process 400 may comprise receiving, based at least in part on the presentation, input identifying a proposed trajectory 412 from among the candidate trajectory(ies), according to any of the techniques discussed herein. In examples where the teleoperator is a human user, the input may comprise input via an input device, such as a touch screen, mouse, keyboard, microphone, or the like that identifies the trajectory 412. In an example where the teleoperator is an ML pipeline, the trajectory 412 may be an output of the ML pipeline or may be identified by a classification output or regression output of the ML pipeline. In some examples, the input may additionally or alternatively identify a weight associated with the proposed trajectory. In an additional or alternate example, the weight may be determined by the autonomous vehicle based at least in part on the proposed trajectory.

In some examples, the proposed trajectory may be generated or selected based at least in part on historic data and/or additional data received at and/or presented by the remote computing device. For example, the historic data may comprise a trajectory, sensor data, perception data, and/or the like associated with the same or another vehicle in a same or similar environment. Determining that historic data is available may comprise providing at least part of environmental information to an ML model and receiving a database index or another indication of other former data stored in a database.

At operation 414, example process 400 may comprise transmitting the proposed trajectory to the autonomous vehicle (i.e., as the first trajectory, as discussed above regarding example process 300), according to any of the techniques discussed herein.

At operation 416, example process 400 may comprise receiving a control trajectory 418 from the autonomous vehicle, according to any of the techniques discussed herein. For example, the autonomous vehicle may determine the control trajectory based at least in part on the proposed trajectory and the autonomous vehicle may transmit the control trajectory to the remote computing device as a means of confirmation, if the path is not yet complete, and/or if an obstacle has not been passed yet.

At operation 420, example process 400 may comprise determining and/or receiving from the autonomous vehicle, one or more additional trajectories 422. For example, the additional trajectory(ies) 422 may be determined based at least in part on an end pose of the control trajectory. In some examples, the autonomous vehicle and/or the remote computing device may determine the additional trajectory(ies) 422 when the path isn't complete yet and/or when an event is not yet resolved (e.g., no lane is unobstructed by an object, object(s) of a particular type are still in the roadway). Example process 400 may return to operation(s) 410 and/or 414 as necessary until the autonomous vehicle generates an indication that the need for teleoperator assistance is over, until the teleoperator provides input indicating a termination to the input, and/or until the event resolves.

Example Collaborative Path-Building

Figure 5A:
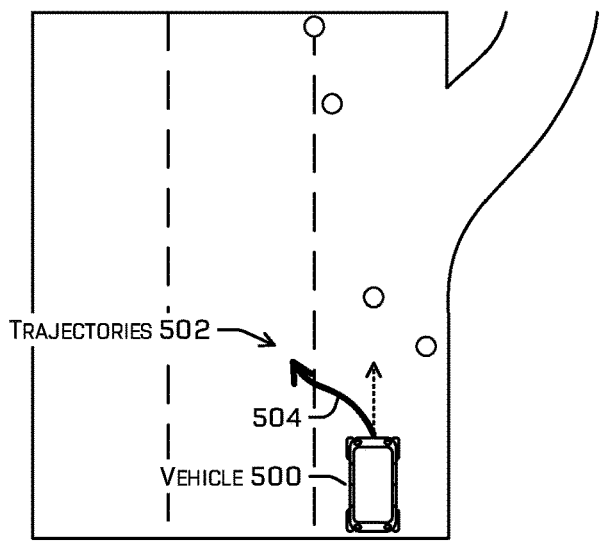
FIGS. 5A-5C illustrate a top-down representation of successful collaboration between a teleoperations system and an autonomous vehicle to generate a path for controlling the autonomous vehicle.
Figure 5B:
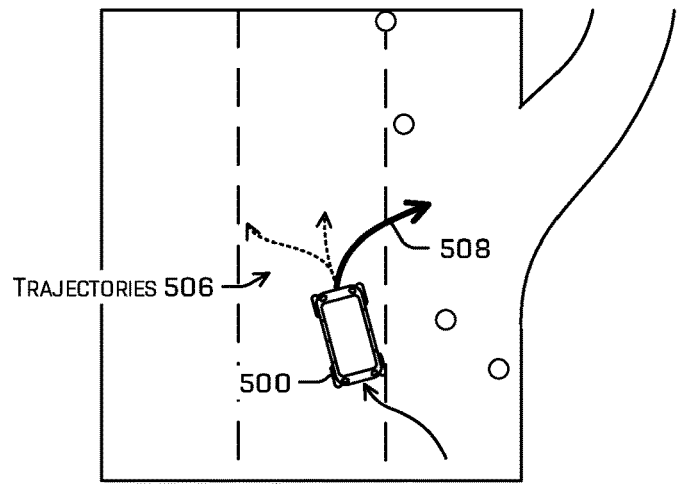
Figure 5C:
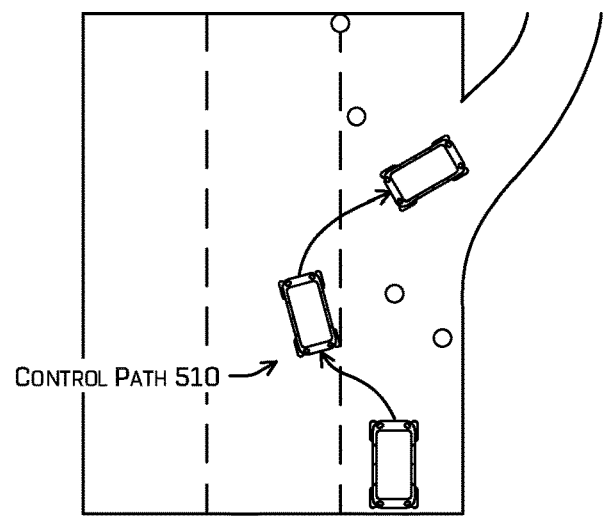

FIGS. 5A-5C depict a top-down representation of successful collaboration between a teleoperations system and an autonomous vehicle to generate a path for controlling the autonomous vehicle in view of some oddly placed traffic cones around a highway exit. In such an example, the autonomous vehicle may transmit the request to teleoperations because the autonomous vehicle needs to use the exit to complete a route, but the cones are ambiguously placed such that it's difficult to determine whether the exit is closed or whether the lane and the exit are both closed. Such a situation might cause confidence scores associated with the candidate trajectories generated by the vehicle to not meet or exceed a confidence score threshold, triggering a request to be sent to the teleoperations system. FIGS. 5A-5C may depict the results of example process(es) 300 and 400. FIG. 5A depicts a vehicle 500 that has requested teleoperator assistance and the two trajectories 502, one bolded and one dashed, that the vehicle 500 or the teleoperation system generated. Teleoperator input indicates a selection of trajectory 504, which is bolded to indicate the selection.

FIG. 5B depicts a potential position of the vehicle 500 at a future time step and the three trajectories 506 determined by the vehicle and/or the teleoperations system. Teleoperator input indicates a selection of trajectory 508. Note that although FIGS. 5A and 5B depict two and three trajectories respectively, more or less trajectories may be generated by the autonomous vehicle and/or the teleoperation system.

FIG. 5C depicts the control path 510 comprising two trajectories for controlling the autonomous vehicle over the time horizon. In some examples, the control path 510 may comprise trajectories that may be different than the trajectory(ies) indicated by the teleoperations system since the autonomous vehicle may use such trajectory(ies) a part of the process for generating control trajectory(ies). In the depicted instance, the two trajectories are sufficient for resolving the event although in other examples, more or less trajectories may be collaboratively determined.

Example Clauses

A. A method comprising: receiving, at a device remote from an autonomous vehicle, a request for assistance and sensor data associated with an environment of the autonomous vehicle; determining, based at least in part on the sensor data, two or more candidate trajectories; displaying, at the device, a representation of the environment and the two or more candidate trajectories; receiving, at the device, input identifying a proposed trajectory from among the two or more candidate trajectories; and transmitting the proposed trajectory to the autonomous vehicle, the autonomous vehicle configured to determine a path for controlling the autonomous vehicle based at least in part on the proposed trajectory.

B. The method of paragraph A, wherein: transmitting the proposed trajectory to the autonomous vehicle comprises transmitting a weight associated with the proposed trajectory; and the autonomous vehicle generates a set of candidate trajectories based at least in part on the sensor data and the weight and determines one of the set of candidate trajectories based at least in part on the weight.

C. The method of either paragraph A or B, further comprising: determining a second set of candidate trajectories based at least in part on the proposed trajectory, the second set of candidate trajectories comprising a start position associated with an end position of the proposed trajectory; receiving input identifying a second proposed trajectory from among the second set of candidate trajectories; and transmitting the second proposed trajectory to the autonomous vehicle, wherein the path is further based at least in part on the second proposed trajectory.

D. The method of any one of paragraphs A-C, further comprising: receiving, from the autonomous vehicle, a second set of candidate trajectories generated by the autonomous vehicle based at least in part on the proposed trajectory; receiving input identifying a second proposed trajectory from among the second set of candidate trajectories; and transmitting the second proposed trajectory to the autonomous vehicle, wherein the path is further based at least in part on the second proposed trajectory.

E. The method of any one of paragraphs A-D, wherein determining the two or more candidate trajectories is based at least in part on at least one of object data or map data determined based at least in part on the sensor data.

F. The method of any one of paragraphs A-E, wherein the proposed trajectory identifies at least one of a region, a lane, a location, or a weight that is used as part of a search algorithm running on the autonomous vehicle to identify the path.

G. A system comprising: one or more processors; and a memory storing processor-executable instructions that, when executed by the one or more processors, cause the system to perform operations comprising: receiving, at a device remote from an autonomous vehicle, a request for assistance, a trajectory for the autonomous vehicle, and data associated with an environment of the autonomous vehicle; determining, at the device, based on the data and the trajectory, in response to receiving the request for assistance, a proposed trajectory; and transmitting the proposed trajectory to the autonomous vehicle.

H. The system of paragraph G, wherein the operations further comprise: determining, by the one or more processors, a second set of candidate trajectories based at least in part on the proposed trajectory, the second set of candidate trajectories comprising a start position associated with an end position of the proposed trajectory; and transmitting a second proposed trajectory to the autonomous vehicle, the second proposed trajectory being determined from among the second set of candidate trajectories.

I. The system of either paragraph G or H, wherein the operations further comprise: receiving, from the autonomous vehicle, a second set of candidate trajectories generated by the autonomous vehicle based at least in part on the proposed trajectory; identifying a second proposed trajectory from among the second set of candidate trajectories; and transmitting the second proposed trajectory to the autonomous vehicle.

J. The system of any one of paragraphs G-I, wherein the operations further comprise: generating a plurality of proposed trajectories for the vehicle including the proposed trajectory; wherein the proposed trajectory is determined, from among the plurality of proposed trajectories, based on a weighting associated with the trajectory of the vehicle received at the device.

K. The system of any one of paragraphs G-J, wherein the proposed trajectory is determined based at least in part on: historic data associated with a vehicle in a similar environment as the autonomous vehicle; or additional data that provides addition information regarding the environment than the data associated with the environment received from the autonomous vehicle.

L. One or more non-transitory computer-readable media storing processor-executable instructions that, when executed by one or more processors, cause the one or more processors to perform operations comprising: receiving first sensor data from one or more sensors associated with an autonomous vehicle and a target location; determining, based at least in part on the first sensor data and the target location, a first trajectory; determining a confidence score associated with the trajectory is less than a threshold; transmitting, based at least in part on determining that the confidence score is less than the threshold, to a remote computing device, a request for teleoperator input; receiving, from the remote computing device, a proposed trajectory; receiving second sensor data from the one or more sensors associated with the autonomous vehicle; determining, based at least in part on the second sensor data, a second trajectory; and determining a control trajectory based at least in part on the proposed trajectory and the second trajectory.

M. The one or more non-transitory computer-readable media of paragraph L, wherein: the operations further comprise receiving a weight associated with the proposed trajectory; and determining the control trajectory comprises: determining a cost associated with the control trajectory based at least in part on the weight; and determining the control trajectory from a set of trajectories based at least in part on the cost.

N. The one or more non-transitory computer-readable media of paragraph M, wherein determining the control trajectory is based at least in part on a tree search.

O. The one or more non-transitory computer-readable media of any one of paragraphs L-N, wherein the operations further comprise: transmitting a set of trajectories from the autonomous vehicle to the device; and wherein the proposed trajectory is one of the set of trajectories sent to the device.

P. The one or more non-transitory computer-readable media of any one of paragraphs L-O, wherein the operations further comprise: at least one of: receiving, from the remote computing device, a third trajectory; or determining the second trajectory based at least in part on the control trajectory, wherein the third trajectory comprises a start position associated with an end position of the control trajectory.

Q. The one or more non-transitory computer-readable media of any one of paragraphs L-P, wherein the first trajectory is different from the second trajectory.

R. The one or more non-transitory computer-readable media of any one of paragraphs L-Q, wherein the control trajectory is different than the proposed trajectory.

S. The one or more non-transitory computer-readable media of any one of paragraphs L-R, wherein the proposed trajectory identifies at least one of a region, a lane, a location, or a weight that is used as part of a search algorithm executed by the autonomous vehicle to identify the control trajectory.

T. The one or more non-transitory computer-readable media of any one of paragraphs L-S, wherein the control trajectory is generated at the remote computing device.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
receiving, at a device remote from an autonomous vehicle, a request for assistance and sensor data associated with an environment of the autonomous vehicle;
determining, based at least in part on the sensor data, two or more candidate trajectories, wherein the two or more candidate trajectories comprise separate instructions configured to actuate drive components of the autonomous vehicle;
displaying, at the device, a representation of the environment and the two or more candidate trajectories;
receiving, at the device, input identifying a proposed trajectory from among the two or more candidate trajectories; and
transmitting the proposed trajectory to the autonomous vehicle, the autonomous vehicle configured to determine a path for controlling the autonomous vehicle based at least in part on the proposed trajectory, wherein the path comprises a first control trajectory that the autonomous vehicle determines based at least in part on the proposed trajectory and a second control trajectory that is based at least in part on the first control trajectory.

2. The method of claim 1, wherein:
transmitting the proposed trajectory to the autonomous vehicle comprises transmitting a weight associated with the proposed trajectory; and
the autonomous vehicle generates a set of candidate trajectories based at least in part on the sensor data and the weight and determines one of the set of candidate trajectories based at least in part on the weight.

3. The method of claim 1, further comprising:
determining a second set of candidate trajectories based at least in part on the proposed trajectory, the second set of candidate trajectories comprising a start position associated with an end position of the proposed trajectory;
receiving input identifying a second proposed trajectory from among the second set of candidate trajectories; and
transmitting the second proposed trajectory to the autonomous vehicle, wherein the path is further based at least in part on the second proposed trajectory.

4. The method of claim 1, further comprising:
receiving, from the autonomous vehicle, a second set of candidate trajectories generated by the autonomous vehicle based at least in part on the proposed trajectory;
receiving input identifying a second proposed trajectory from among the second set of candidate trajectories; and
transmitting the second proposed trajectory to the autonomous vehicle, wherein the path is further based at least in part on the second proposed trajectory.

5. The method of claim 1, wherein determining the two or more candidate trajectories is based at least in part on at least one of object data or map data determined based at least in part on the sensor data.

6. The method of claim 1, wherein the proposed trajectory identifies at least one of a region, a lane, a location, or a weight that is used as part of a search algorithm running on the autonomous vehicle to identify the path.

7. A system comprising:
one or more processors; and
a memory storing processor-executable instructions that, when executed by the one or more processors, cause the system to perform operations comprising:
receiving, at a device remote from an autonomous vehicle, a request for assistance, a trajectory for the autonomous vehicle, and data associated with an environment of the autonomous vehicle;
determining, at the device, based on the data and the trajectory, in response to receiving the request for assistance, a proposed trajectory, wherein the proposed trajectory comprises instructions for actuating a drive component of the autonomous vehicle; and
transmitting the proposed trajectory to the autonomous vehicle, wherein the autonomous vehicle is configured to determine a control trajectory based at least in part on the proposed trajectory.

8. The system of claim 7, wherein the operations further comprise:
determining, by the one or more processors, a second set of candidate trajectories based at least in part on the proposed trajectory, the second set of candidate trajectories comprising a start position associated with an end position of the proposed trajectory; and
transmitting a second proposed trajectory to the autonomous vehicle, the second proposed trajectory being determined from among the second set of candidate trajectories.

9. The system of claim 7, wherein the operations further comprise:
receiving, from the autonomous vehicle, a second set of candidate trajectories generated by the autonomous vehicle based at least in part on the proposed trajectory;
identifying a second proposed trajectory from among the second set of candidate trajectories; and
transmitting the second proposed trajectory to the autonomous vehicle.

10. The system of claim 7, wherein the operations further comprise:
generating a plurality of proposed trajectories for the autonomous vehicle including the proposed trajectory;
wherein the proposed trajectory is determined, from among the plurality of proposed trajectories, based on a weighting associated with the trajectory of the autonomous vehicle received at the device.

11. The system of claim 7, wherein the proposed trajectory is determined based at least in part on:
historic data associated with a vehicle in a similar environment as the autonomous vehicle; or
additional data that provides addition information regarding the environment than the data associated with the environment received from the autonomous vehicle.

12. One or more non-transitory computer-readable media storing processor-executable instructions that, when executed by one or more processors, cause the one or more processors to perform operations comprising:
receiving first sensor data from one or more sensors associated with an autonomous vehicle and a target location;
determining, based at least in part on the first sensor data and the target location, a first trajectory;
determining a confidence score associated with the first trajectory is less than a threshold;
transmitting, based at least in part on determining that the confidence score is less than the threshold, to a remote computing device, a request for teleoperator input;
receiving, from the remote computing device, a proposed trajectory comprising first instructions configured to actuate drive components of the autonomous vehicle;
receiving second sensor data from the one or more sensors associated with the autonomous vehicle;
determining, based at least in part on the second sensor data, a second trajectory; and
determining a control trajectory based at least in part on the proposed trajectory and the second trajectory, the control trajectory comprising second instructions configured to actuate the drive components.

13. The one or more non-transitory computer-readable media of claim 12, wherein:
the operations further comprise receiving a weight associated with the proposed trajectory; and
determining the control trajectory comprises:
determining a cost associated with the control trajectory based at least in part on the weight; and
determining the control trajectory from a set of trajectories based at least in part on the cost.

14. The one or more non-transitory computer-readable media of claim 13, wherein determining the control trajectory is based at least in part on a tree search.

15. The one or more non-transitory computer-readable media of claim 12, wherein the operations further comprise:
transmitting a set of trajectories from the autonomous vehicle to the remote computing device, wherein the request for teleoperator input comprises the set of trajectories generated by the autonomous vehicle; and
wherein the proposed trajectory is one of the set of trajectories sent to the remote computing device.

16. The one or more non-transitory computer-readable media of claim 12, wherein the operations further comprise:
at least one of:
receiving, from the remote computing device, a third trajectory; or
determining the second trajectory based at least in part on the control trajectory,
wherein the third trajectory comprises a start position associated with an end position of the control trajectory.

17. The one or more non-transitory computer-readable media of claim 12, wherein the first trajectory is different from the second trajectory.

18. The one or more non-transitory computer-readable media of claim 12, wherein the control trajectory is different than the proposed trajectory.

19. The one or more non-transitory computer-readable media of claim 12, wherein the proposed trajectory identifies at least one of a region, a lane, a location, or a weight that is used as part of a search algorithm executed by the autonomous vehicle to identify the control trajectory.

20. The one or more non-transitory computer-readable media of claim 12, wherein the control trajectory is generated at the remote computing device.

* * * * *